Nov. 10, 1970     H. D. MONTAGUE     3,538,607

MECHANICAL MOVEMENT FOR DRAWING LINES

Filed Jan. 2, 1969

INVENTOR
HARRY D. MONTAGUE

BY Browne, Schuyler & Beveridge

ATTORNEYS

United States Patent Office 3,538,607
Patented Nov. 10, 1970

3,538,607
MECHANICAL MOVEMENT FOR DRAWING LINES
Harry D. Montague, 3606 Newark St. NW.,
Washington, D.C. 20016
Filed Jan. 2, 1969, Ser. No. 788,550
Int. Cl. B43l 13/00
U.S. Cl. 33—32
18 Claims

ABSTRACT OF THE DISCLOSURE

A working gear is operatively engaged with a reference gear and carries a working element which moves in a linear path through the axis of rotation of the reference gear. The reference gear is positively rotatable to change the orientation of the linear path of the working element. The axis of the working gear is positively moved in an arcuate path generated from the axis of the reference gear.

BACKGROUND

This invention relates to a mechanism which employs a pair of operatively engaged gears for producing orientable linear movement of a working element.

One suitable environment for this invention is in automatic lettering or drafting machines, where a stylus is retractably engaged with the paper or other work surface. The ability of the invention to move a working element such as a stylus in straight lines having any selected orientation renders it capable of producing letters, numerals and other characters.

The well known principle of Cardan gearing is used for producing linear movement with a pair of operatively engaged gears. This invention surpasses the usual Cardan gear movement since it provides for variations in the orientation of the linear movement.

SUMMARY

A reference gear is positively rotatable about its own axis and is operatively engaged with a working gear which carries a working element. The axis of rotation of the working gear may be positively moved in an arcuate path generated from the axis of the reference gear. The relative movement of the gears produces movement of the working element in a linear path which passes through the axis of the reference gear. The reference gear may be rotated about its own axis to change the angular disposition or bearing of the working element with respect thereto, thus positioning the working element and changing the orientation of its linear path.

Preferably, the mechanism uses a reference gear which is an internal ring gear having an effective diameter twice the effective diameter of the working gear which rides around its interior with the working element being aligned with the periphery of the working gear. This arrangement results in linear movement of the working element when the reference gear is stationary and the axis of the working gear is positively moved in an arcuate path generated from the center of the reference gear. Reorientation of the linear path is then achieved by moving the reference gear, either with or without a concurrent movement of the axis of the working gear.

Alternatively, both the reference and working gears may be spur gears having 2:1 diameter ratio which are operatively connected together by an intermediate idler gear. In this arrangement, the distance from the center of the working gear to the working element is equal to the distance between the centers of the two spur gears.

Rather than using the 2:1 gear ratio, it is possible to use other gear ratios, provided that the reference gear is rotated about its axis when the axis of the working gear is moved in its arcuate path about the reference gear axis. The angular velocity of the reference gear in this situation must be calculated to maintain the working element at a constant angular displacement or bearing from the axis of the reference gear.

THE DRAWINGS

FIG. 2 is a diagrammatic plan view of the apparatus of FIG. 1, showing the reorientation of the reference gear in order to change the orientation of the linear path taken by the working element;

DESCRIPTION OF THE ILLUSTRATED EMBODIMENTS

Figure 1:
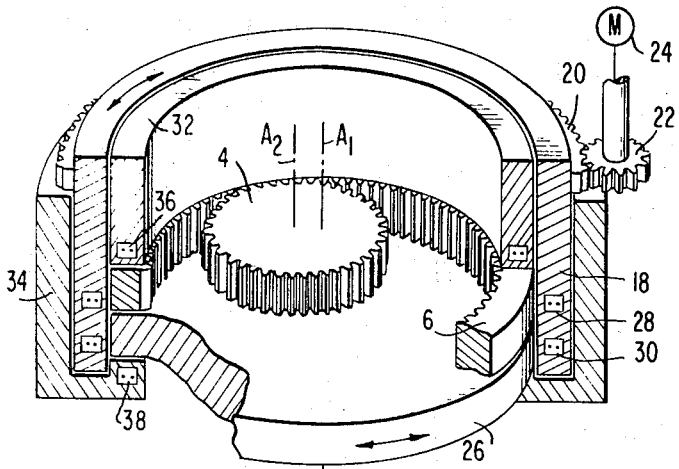
FIG. 1 is a perspective view, partially in section, showing a preferred form of apparatus used in the practice of the invention.

FIG. 1 shows the basic elements of a stylus-positioning head which incorporates the features of this invention. The stylus-positioning head may be supported for movement over a sheet of paper or other workpiece by any suitable structure such as a beam and trammel support.

Basically, the purpose of the mechanism shown in FIG. 1 is to scribe a straight line with a stylus member 2 which is the working element attached to the working gear 4. To accomplish this, the gear 4 has its teeth meshed with the teeth on an internal ring gear 6 which serves as the reference gear. The gear 6 is rotatable about its axis $A_1$, and the working gear 4 is rotatable about its own axis $A_2$. The working gear 4 has an effective diameter which is one-half that of the effective diameter of the reference gear 6. Therefore, according to well-known principles of geometry, when the reference gear 6 remains stationary, and the working gear 4 is moved in a path wherein its axis $A_2$ follows an arcuate path generated from the axis $A_1$, a peripheral point on the gear 4 will move in a straight line which passes through the axis $A_1$. By positioning the stylus member 2 in direct alignment with the effective periphery of the gear 4, the stylus may be made to draw a straight line on a table or a piece of paper.

Figure 1A:
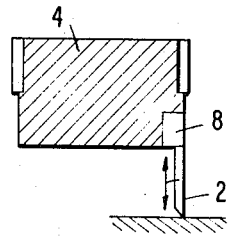
FIG. 1A is a sectional view of the working gear in the apparatus of FIG. 1, wherein the working element is a marking stylus.

When using a stylus or other tool, it may become desirable to elevate it from the work surface. This is possible in the present disclosure by means of a small solenoid 8, illustrated in block form in FIG. 1A, having the capability of raising and lowering the stylus from the work surface.

An important feature of this invention is that the reference gear 6 is movable. This permits reorientation of the linear path of the stylus 2 and also enables the apparatus to position the stylus at any desired position aligned axially within the area defined by the reference gear 6.

Figure 2:
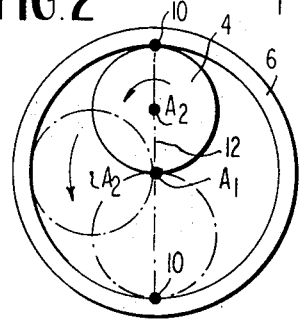
FIG. 2 is a diagrammatic plan view of the apparatus shown in FIG. 1, showing the linear path of the working element.
Figure 3:
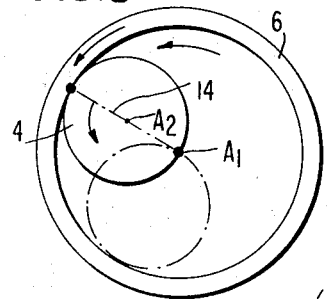
Figure 4:
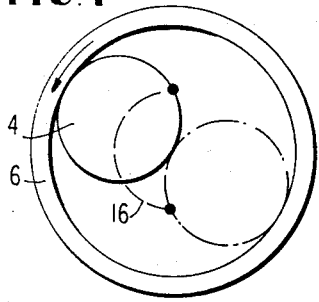
FIG. 4 is also a diagrammatic plan view of the apparatus of FIG. 1, showing the movement of the working element through a circular path.

Three possible combinations of movements of the gears 4 and 6 are illustrated in FIGS. 2–4. In FIG. 2, the reference gear 6 is stationary and the working gear 4 is moved so that its axis $A_2$ follows the arcuate path generated from the axis $A_1$ of the reference gear. In its initial position which is illustrated in solid lines, the gear 4 has its working element 10 against the inner surface of the stationary reference gear 6. As the axis $A_2$ is moved 90° in a counterclockwise direction, the working element 10 will follow the straight line path 12 until it crosses the axis $A_1$. An additional 90° movement of the axis $A_2$ about the axis $A_1$ will cause further movement of the working element 10 along the path 12 until it reaches a position which is diametrically opposed to its starting position. During the course of movement of the axis $A_2$ through 180° in a counterclockwise direction, there has been an equal but opposite rotation of the working element 10 about its axis $A_2$, i.e. the working element 10 has moved 180° about the axis $A_2$ in a clockwise direction.

The orientation of the straight line path 12 may be varied simply by rotating the reference gear 6 about its axis $A_1$, accompanied by an equiangular movement of the axis $A_2$ about the axis $A_1$. For example, if both the reference gear 6 and the axis $A_2$ are rotated counterclockwise through an angle of 50° about the axis $A_1$ in FIG. 2, the starting position would be the solid line position of the gear 4 in FIG. 3. Once at this starting position, the reference gear 6 may be held stationary and the axis $A_2$ may be moved to follow its arcuate path about the axis $A_1$ to scribe the newly-oriented straight line 14.

Independent rotation of the gear 6 about its axis will result in a circular movement of the working element. If the axis $A_2$ of gear 4 is held in a stationary position, the working element 10 will describe a circular path coincident with the periphery of the gear 4. As shown in FIG. 4, rotation of the reference gear 6 accompanied by a similar movement of the axis $A_2$ about the axis $A_1$ will result in the movement of the working element through a circular path 16. Of course, the diameter of the path 16 may be controlled by and depends upon the distance from the axis $A_1$ to the working element 10 as the line is scribed.

The mechanism for driving the gears in the pattern illustrated in FIGS. 2–4 may vary considerably, one suitable form being illustrated in an abbreviated fashion in FIG. 1. Referring to FIG. 1, it will be noted that both of the gears 4 and 6 may be positively driven by a common drive ring 18. The drive ring 18 is driven through peripheral teeth 20 which engage a spur gear 22 associated with the reversible driving motor 24.

Magnetic means may be used for engaging the drive ring 18 with either the gear 6 or the support disc 26 which holds the gear 4. The circular support disc 26 is concentric with and rotates about the axis $A_1$. The drive ring 18 acts as a retainer means for constraining the reference ring gear 6 and the support disc 26 to rotation about the axis $A_1$. An aperture in the disc 26 rotatably receives the lower portion of gear 4. Therefore, any rotation of the disc 26 will produce arcuate movement of the axis $A_2$ about the axis $A_1$.

Within the walls of the members 6 and 26, there are a series of spaced apart magnetizable elements or pole pieces which may be attracted by similarly spaced apart electromagnetic pole pieces of coils 28 and 30 in the drive ring 18. When the magnetic coil 28 is energized, the reference gear 6 will turn with the drive ring 18; and, when the coil 30 is energized, the disc 26 will rotate with the drive ring 18.

Of course, some of the movements of this device requires that either the axis $A_2$ or the reference gear 6 remain stationary. Accordingly, the stationary braking rings 32 and 34 are provided. The braking ring 32 has an electromagnetic coil 36 with spaced apart pole pieces which, when energized, will immobilize the reference gear 6. The coil 38 attached to the braking ring 34 is used to hold the disc 26 in a stationary position to prevent movement of the axis $A_2$ of the gear 4.

When the apparatus of FIG. 1 is used for drawing straight lines, the coil 36 is energized to hold the reference gear 6 in a stationary position. The coil 30 is energized so that the rotation of the drive ring 18 will be imparted to the disc 26, thus moving the axis $A_2$ in its arcuate path about the axis $A_1$. As indicated in FIG. 2, this will produce the desired straight line movement. Reorientation of the straight line to a position such as shown in FIG. 3 may be accomplished by energizing both of the coils 28 and 30 during the rotation of the drive ring 20. At the same time, a circular pattern such as shown in FIG. 4 might be followed. By various combinations of movements of the elements shown in FIG. 1, the apparatus may move the working element through intricate paths. The driving of the drive ring 18 and the selective energization of the coils 28, 30, 36 and 38 may be programmed by a computer or other suitable electronic apparatus. Likewise, input signals may be fed to the device from servo mechanisms attached to a similar device in a remote location, with one unit acting as a transmitter and the other unit operating as a receiver.

Figure 5:
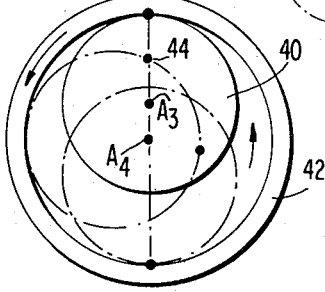
FIG. 5 shows a modification of the apparatus of FIGS. 1–4, involving a working gear with a diameter more than half the diameter of the reference gear.

In the modified form of the apparatus as shown in FIG. 5, the working gear is designated 40 and its axis of rotation is $A_3$. The reference gear is again an internal ring gear 42 which rotates about its axis $A_4$. A principal difference of this device from the one shown in FIGS. 1–4 is that the diameter of the working gear 40 is greater than one-half the diameter of the reference gear 42. As in the previous case, however, the axis $A_3$ of the working wear is equidastant from the working element 44 and the axis $A_4$ of the reference gear.

If it is desired to produce a straight line movement of the working element 44 in the FIG. 5, it is necessary simultaneously to rotate the ring gear 42 and move the axis $A_3$ about the axis $A_4$. Their angular velocities are so coordinated that the angular displacement of the gear 40 about its axis $A_3$ is equal in magnitude but opposite in direction to the angular displacement of the axis $A_3$ about the axis $A_4$. In the sequence of positions shown, the axis $A_3$ moves counterclockwise through an arc of 180°, while the gear 40 moves about its axis $A_3$ through 180° in a clockwise direction. Of course, by selective movement of the elements shown in FIG. 5, other patterns may be drawn.

Figure 6:
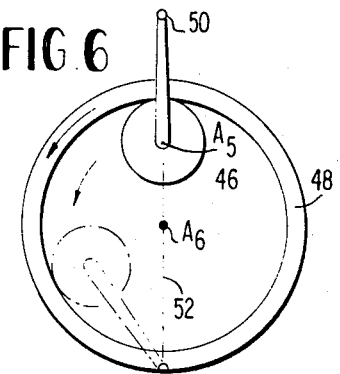
FIG. 6 shows another modification of the apparatus of FIGS. 1–4, having a working gear with a diameter less than half the diameter of the refernece gear.

The modification shown in FIG. 6 is similar to that described in connection with FIG. 5, except that the working gear 46 has a diameter less than half that of the reference gear 48. The distance from the axis $A_5$ to the working element 50 is equal to the distance from the axis $A_5$ to the central axis $A_6$ of the reference gear 48. Proper selection of angular velocities of the axis $A_5$ moving about the axis $A_6$ and of the reference gear 48 will produce the desired movement and cause the apparatus to scribe the straight line represented at 52.

Figure 7:
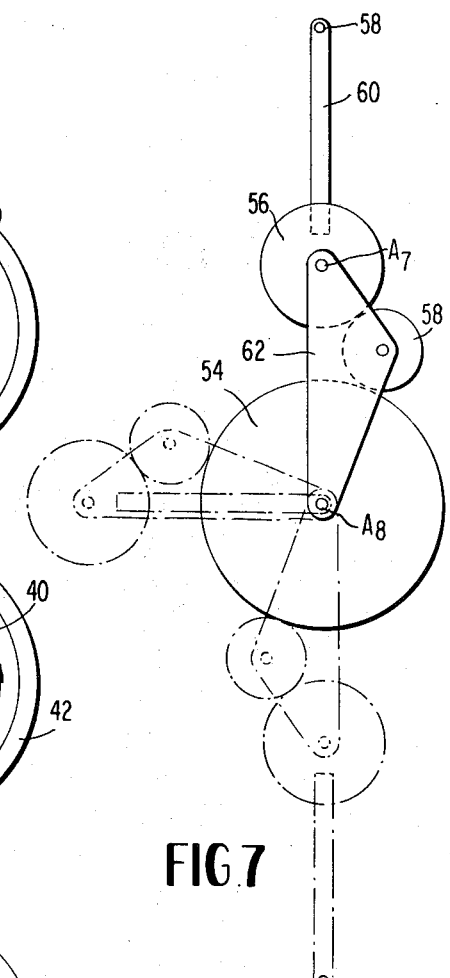
FIG. 7 is another modification of the apparatus of FIGS. 1–4, using spur gears for the reference and working gears.

The modification of FIG. 7 includes a known variation of the Cardan gear mechanism which uses spur gears for both the reference gear and the working gear. The reference gear 54 has a diameter twice that of the working gear 56. The axis $A_7$ of the working gear is equidistant from the axis $A_8$ of the reference gear and the working element 58 which is at the end of an elongated arm 60. A bracket 62 is rotatable about the axis $A_8$ and carries for rotation the working gear 56 and an interposed idler gear 58 which operatively connects the gears 54 and 56.

In FIG. 7, the movement of the axis $A_7$ in a counter clockwise direction will produce angular movement of the gear 56 and the working element 58 about the axis $A_7$ in a clockwise direction so that the working element 58 will follow a straight line path to its final position which is at the lowermost portion of FIG. 7. Of course, as in the previous instances, if the diameter ratio between the gears 54 and 56 differs from the preferred 2:1 ratio, the velocities of the gears 54 and 56 must be such that the angular displacement of the axis $A_7$ about the axis $A_8$ will be equal in magnitude but opposite in direction to the angular displacement of the working element 58 about the axis $A_7$.

Figure 8:
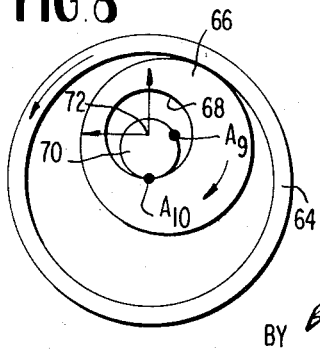
FIG. 8 shows a modified form of the invention, utilizing two superposed mechanisms of the type shown in FIG. 5.

In the modification shown in FIG. 8, two mechanisms of the type depicted in FIG. 5 are shown. The basic part of this mechanism involves the reference gear 64 and the first working gear 66.

As previously, proper selection of the velocity of the axis $A_9$ about the axis $A_{10}$ will result in the desired movement of the circular opening 68 through a straight line path. The central axis $A_9$ of the gear 66 is equally spaced from the center of opening 68 and the axis $A_{10}$. In this case, the working element 72 is on a separate gear 70 which uses the opening 68 in gear 66 for a reference gear. The central axis of the gear 70 is equidistant from the center of opening 68 and the working element 72. Proper control of the movement of these elements will permit positioning of the element 72 and its movement along either or both of two coordinate axes which are indicated by arrows in FIG. 8.

In the preceding discussion of the invention, only a few of many possible embodiments have been described and shown. Many variations to the invention will naturally occur in the course of the development of this art. It is accordingly intended that the invention be defined by the claims that follow rather than by the specific embodiments shown.

I claim:

1. Apparatus for producing variably oriented linear movement of a working element comprising
   a reference gear concentric with and rotatable about a first axis,
   a working gear operatively engaged with the reference gear and being rotatable about a second axis which is movable in an arcuate path around the first axis, said working element being attached to the working gear at a position spaced from the second axis a distance equal to the distance between the first and second axes,
   drive means capable of independently (1) relatively moving the gears to produce an angular displacement of the working gear about its axis which is equal in magnitude and opposite in direction to a concurrent angular displacement of the second axis about the first axis, and (2) changing the angular bearing of the working element from the first axis.

2. Apparatus according to claim 1 wherein the reference gear is an internal ring gear and the working gear is a spur gear directly engaged therewith.

3. Apparatus according to claim 1 wherein both gears are spur gears.

4. Apparatus according to claim 1 wherein the working element is a stylus, and means for moving the stylus in a direction having components parallel to said axes thereby to raise and lower the stylus from a work surface.

5. Apparatus according to claim 1 in which the drive means includes a driving member rotatable about the first axis, and means for releasably engaging the reference gear with the driving member.

6. Apparatus according to claim 5 having a stationary first braking member, and means for releasably engaging the reference gear with the first braking member.

7. Apparatus according to claim 5 wherein the working gear is rotatably mounted on a support member which is rotatable about the first axis, and means for releasably engaging the support member with the driving member.

8. Apparatus according to claim 1 wherein the working gear is rotatably mounted on a support member which is rotatable about the first axis, a driving member rotatable about the first axis, and means for releasably engaging the support member with the driving member.

9. Apparatus according to claim 1 wherein said working gear has an effective diameter which is one-half that of the reference gear, thereby resulting in movement of the working element through a straight line path when the reference gear is stationary.

10. Apparatus according to claim 9 wherein the reference gear is an internal ring gear and the working gear is a spur gear directly engaged therewith.

11. Apparatus according to claim 9 wherein both gears are spur gears.

12. Apparatus according to claim 9 wherein the working element is a stylus, and means for moving the stylus in a direction having components parallel to said axes thereby to raise and lower the stylus from a work surface.

13. Apparatus according to claim 9 in which the drive means includes a driving member rotatable about the first axis, and means for releasably engaging the reference gear with the driving member.

14. Apparatus according to claim 13 having a stationary first braking member, and means for releasably engaging the reference gear with the first braking member.

15. Apparatus according to claim 13 wherein the working gear is rotatably mounted on a support member which is rotatable about the first axis, and means for releasably engaging the support member with the driving member.

16. Apparatus according to claim 1 wherein the reference gear is an internal ring gear and the working gear is a spur gear, a circular support member concentric with the first axis and supporting the working gear, said working gear being mounted for rotation about the second axis on the circular support member, and retainer means circumferentially surrounding the circular support member to constrain its rotation to rotation about the first axis.

17. Apparatus according to claim 16 wherein the reference gear is also circumferentially surrounded by the retainer means to constrain the movement of the reference gear to its said rotation about the first axis.

18. Apparaus according to claim 16 wherein said working gear has an effective diameter which is one-half that of the reference gear, thereby resulting in movement of the working element through a straight line path when the reference gear is stationary.

References Cited

UNITED STATES PATENTS

| 1,876,069 | 9/1932 | O'Byrne | 33—30 |
| 3,230,624 | 1/1966 | Fisher | 33—27 |

HARRY N. HAROIAN, Primary Examiner